(12) United States Patent
Takeda (10) Patent No.: US 7,440,028 B2
(45) Date of Patent: Oct. 21, 2008

(54) VIBRATION-PROOF LENS DEVICE

(75) Inventor: Toshiaki Takeda, Saitama (JP)

(73) Assignee: Fujinon Corporation, Saitama (JP)

( * ) Notice: Subject to any disclaimer, the term of this patent is extended or adjusted under 35 U.S.C. 154(b) by 670 days.

(21) Appl. No.: 10/932,029

(22) Filed: Sep. 2, 2004

(65) Prior Publication Data

US 2005/0058442 A1   Mar. 17, 2005

(30) Foreign Application Priority Data

Sep. 16, 2003   (JP)   ............................... 2003-323327

(51) Int. Cl.
*H04N 5/225* (2006.01)
(52) U.S. Cl. ............. 348/375; 348/208.99; 348/211.99; 348/211.4; 396/52; 396/55
(58) Field of Classification Search ............ 348/208.99, 348/360, 207.99, 208.2, 375, 373, 376, 211.4, 348/211.99; 396/52, 53, 54, 55
See application file for complete search history.

(56) References Cited

U.S. PATENT DOCUMENTS 4,799,072 A * 1/1989 Akimoto et al. ............. 396/429
5,940,631 A * 8/1999 Hirano et al. ................. 396/55
6,009,278 A * 12/1999 Okano et al. .................. 396/55
6,035,134 A * 3/2000 Sato et al. ...................... 396/55
6,757,011 B1 * 6/2004 Takeda et al. ............ 348/208.7
2004/0022530 A1 * 2/2004 Okazaki et al. ............... 396/55
2005/0036774 A1 * 2/2005 Katagishi ...................... 396/55

FOREIGN PATENT DOCUMENTS

| DE | 199 14 208 A1 | 10/1999 |
| JP | 11-122527 | 4/1999 |
| JP | 2002-318400 | * 10/2002 |

* cited by examiner

*Primary Examiner*—Lin Ye
*Assistant Examiner*—Chriss S Yoder, III
(74) *Attorney, Agent, or Firm*—Young & Thompson (57) ABSTRACT

An anti-vibration controller having an ON/OFF switch for the anti-vibration is arranged on the outer circumference of a fixed lens barrel where extender lenses are positioned. When to manipulate the ON/OFF switch, a cameraperson manually operates a focusing ring with the little and ring fingers, a zooming ring with the middle finger and an iris ring with the index finger, all of the left hand. Then he or she can manipulate the ON/OFF switch of the anti-vibration controller fitted to the outer circumference of the fixed lens barrel with the unengaged thumb without having to move the fingers away from manipulating rings.

16 Claims, 6 Drawing Sheets

VIBRATION-PROOF LENS DEVICE

BACKGROUND OF THE INVENTION

1. Field of the Invention

The present invention relates to a vibration-proof lens device, and more particularly to a vibration-proof lens device equipped with a corrective lens for correcting any image blurring caused by vibration working on the camera.

2. Description of the Related Art

Along with the increase in optical magnification and sophistication in other aspects of optical performance, some of the lens devices used in today's television cameras are equipped with a corrective lens for correcting any image blurring caused by vibration working on the television camera. A lens device provided with a corrective lens (hereinafter referred to as vibration-proof lens device) would have a vibration detecting sensor for detecting vertical and lateral vibrations and a linear motor-equipped corrective lens drive unit among other elements, and the corrective lens is moved by the corrective lens drive unit to a position where any image blurring is to be corrected on the basis of vibration information detected by the vibration detecting sensor.

FIG. 8 in the Japanese Patent Application Publication No. 2002-318400 discloses a television camera to be carried on the shoulder of a cameraperson when in use, and the vibration-proof lens device used in the television camera is externally fitted with an electrical drive unit as shown in FIG. 7. The electrical drive unit is provided with a plurality each of switches and levers to be manipulated by the cameraperson on whose shoulder is the camera, and the focal distance, aperture and other factors can be changed as appropriate by manipulating these switches and levers. The anti-vibration function can be turned on or off by manipulating an ON/OFF switch.

Another example is disclosed in the Japanese Patent Application Publication No. 11-122527, in which the television camera is fixed to the pan head of a tripod, and the cameraperson manipulates the manual focusing ring of the lens device with one hand while adjusting the direction of the camera with the other hand.

SUMMARY OF THE INVENTION

When a television camera having a vibration-proof lens device to which an electrical drive unit is externally fitted as described in the Japanese Patent Application Publication No. 2002-318400 is to be operated in a state of being fixed to the pan head of a tripod as described in the Japanese Patent Application Publication No. 11-122527, there is a disadvantage that, as the ON/OFF switch provided on the electrical drive unit is in a position distant from the manipulation rings such as the manual focusing ring and the manual zooming ring, the cameraperson has to move his or her hand off the manipulation rings when the ON/OFF switch is to be manipulated. This motion of the hand away from the manipulation rings could invite a lag between the adjustment timings of the focus and the focal distance and thereby adversely affect the shooting performance.

The Japanese Patent Application Publication No. 2002-318400 further discloses another feature that an anti-vibration switch unit is connected to the electrical drive unit via a connector and this anti-vibration switch unit is fitted in a position of the cameraperson's preference. However, depending on the fitting position of the anti-vibration switch unit, the vibration-proof lens device may become unnecessarily large, and obstruct the operation of the manipulation rings and the panning and/or tilting of the television camera fitted to the panning head.

An object of the present invention, attempted in view of this circumstance, is to provide a vibration-proof lens device which permits the cameraperson to manipulate the ON/OFF switch for the anti-vibration function while operating manipulation rings and in which the ON/OFF switch is fitted in a position not obstructive to the operation of the manipulation rings and convenient for its own manipulation.

In order to achieve the object stated above, the vibration-proof lens device according to the present invention comprises a fixed lens barrel, a corrective lens for correcting image blurring, and a manual manipulation ring disposed rotatably around the fixed lens barrel, and an ON/OFF switch for anti-vibration fitted to an outer circumference of the fixed lens barrel in which an extender lens section or a master lens section provided in the vibration-proof lens device is positioned.

According to the invention, the ON/OFF switch for anti-vibration is arranged on the outer circumference of the fixed lens barrel in which the extender lens section or the master lens section is positioned. When the cameraperson is to manipulate this vibration-proof lens device, he or she can, for instance, manually operate a focusing ring with the little and ring fingers, a zooming ring with the middle finger, and an iris ring with the index finger. And without detaching the fingers from the respective manipulation rings, the cameraperson can manipulate the ON/OFF switch for the anti-vibration function fitted to the outer circumference in the vicinity of the iris ring with the otherwise unengaged thumb. He or she is thereby enabled to manipulate the ON/OFF switch while operating the manipulation rings.

Also according to the invention, the whole anti-vibration function can be made remotely controllable by fitting the ON/OFF switch to a remote control unit detachably installed on the vibration-proof lens device and providing this remote control unit with an ON/OFF indicator lamp, an anti-vibration characteristic change-over switch and a corrective direction change-over switch. Further, by fitting this remote control unit to a control rod of a pan head, the cameraperson is enabled to remotely control the anti-vibration function with the hand manipulating the control rod.

Further according to the invention, the remote control unit can be fitted to an inclined flat part on the outer circumference of the fixed lens barrel. If the cameraperson is positioned opposite this inclined flat part and manipulates the vibration-proof lens device in that position, he or she can touch the remote control unit in a natural way without having to bending the thumb in a strained manner, and accordingly the operating ease of the switches can be improved.

Also according to the invention, note is taken of the circumstance that the smaller diameter of the part of the outer circumference of the fixed lens barrel in which the extender lens section or the master lens section is positioned is formed smaller in diameter than other parts of the outer circumference of the lens barrel in which the focusing lens and the zoom lens are positioned. Since the arrangement of the ON/OFF switch in this smaller diameter part (stepped part) results in virtual elimination of the stepped part, the thumb is enabled to reach without strain the ON/OFF switch, making it possible also to operate the manipulation rings and the ON/OFF switch at the same time without trouble.

Further according to the invention, since the remote control unit is fitted to the outer circumference of the fixed lens barrel via a same linking member detachably fitted to the control rod of the pan head, the remote control unit can be fitted to the vibration-proof lens device in the state of being detached from the control rod as it is. Also, the remote control unit can be fitted to the control rod in the state of being detached from the vibration-proof lens device as it is. Accordingly, the fitting work to be done at the time of changing the fitting position of the remote control unit can be simplified.

Also according to the invention, as the ON/OFF switch fitted to the remote control unit is fitted face up on a plane substantially parallel to an optical axis of the vibration-proof lens device, the operating ease of the ON/OFF switch is improved and, as the ON/OFF indicator lamp is fitted toward the camera on a plane substantially vertical to the optical axis, the cameraperson who manipulates the television camera can readily check the state of the ON/OFF indicator lamp while looking through the viewfinder.

Further in the vibration-proof lens device according to the invention, as the ON/OFF switch for the anti-vibration function is arranged on the part of the outer circumference of the fixed lens barrel in which the extender lens section or the master lens section is positioned, the cameraperson is enabled to manipulate the ON/OFF switch while operating the manipulation rings of the vibration-proof lens device, and to smoothly operate the manipulation rings and the ON/OFF switch with no trouble at all.

DETAILED DESCRIPTION OF THE PREFERRED EMBODIMENTS

The vibration-proof lens device, which is a preferred embodiment of the present invention, will be described in detail below with reference to the accompanying drawings.

Figure 1:
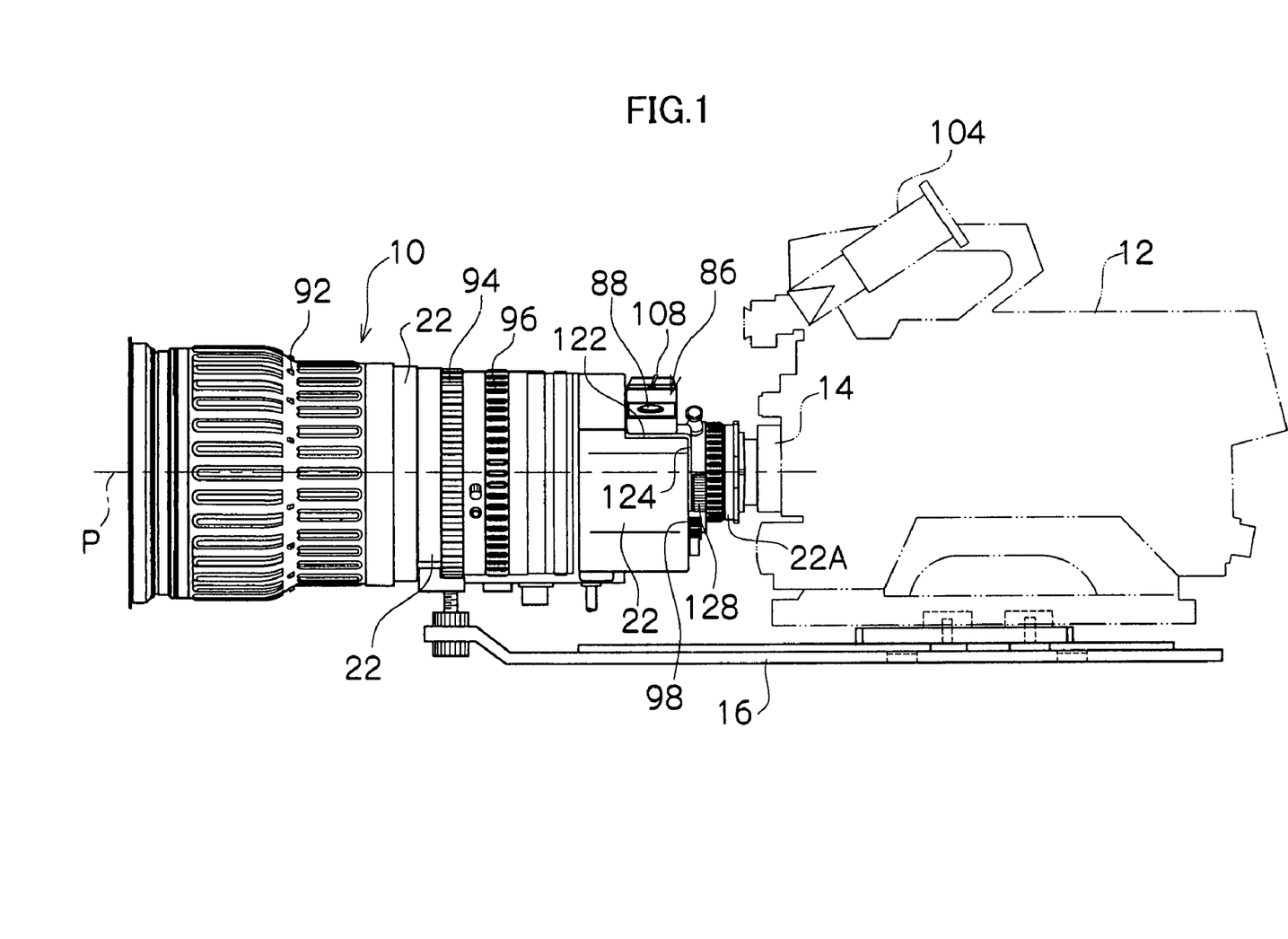
FIG. 1 shows a profile of a television camera provided with a vibration-proof lens device, which is a preferred embodiment of the present invention.
Figure 2:
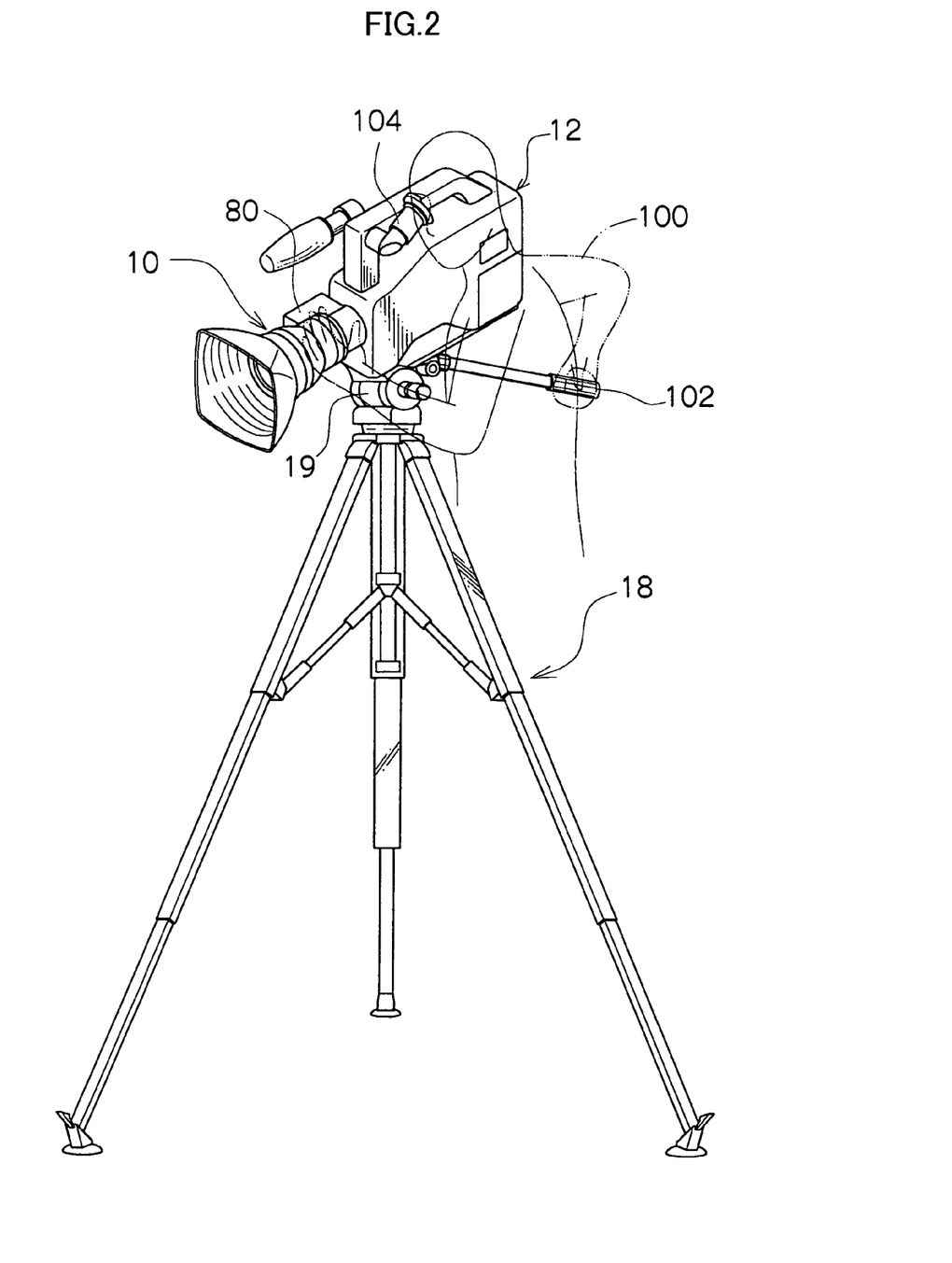
FIG. 2 shows a perspective view of the television camera shown in FIG. I in a state of being fitted to a tripod.

FIG. 1 shows a state in which a vibration-proof lens device 10, which is the preferred embodiment of the present invention, is fitted to the mount 14 of a camera 12 and is supported by a lens supporting member 16 together with the camera 12. The camera 12 shown in FIG. 1 is an shoulder-bearable ENG camera, and the vibration-proof lens device 10 is a high-magnification heavy lens device, of which the zooming ratio is 42:1 and the weight is about 5.5 kg for instance. The vibration-proof lens device 10 and the camera 12 are aligned in optical axis by being moved back and forth, right and left, and up and down on the lens supporting member 16, and, when they are to be used, is fitted to the pan head 19 of a tripod 18 via the lens supporting member 16 as shown in FIG. 2.

Next will be described the anti-vibration mechanism of the vibration-proof lens device 10 with reference to FIG. 3. The corrective lens 20 of the vibration-proof lens device 10 is arranged within a fixed lens barrel 22 and, being held by a lens holding frame 24, is fitted on the shooting optical axis P. By being moved by an X-directional voice coil motor 26 for moving the lens holding frame 24 in the X direction (horizontal direction) in FIG. 3 and by a Y-directional voice coil motor 28 for moving the lens holding frame 24 in the Y direction (perpendicular direction) in FIG. 3 in the X and Y directions in a plane orthogonal to the shooting optical axis P, the corrective lens 20 is compensated for any image blurring caused by vibration working on the vibration-proof lens device 10 and/or the camera 12.

In the X-directional voice coil motor 26, a stator 26B is fixed to the inside face of the fixed lens barrel 22 and a movable element 26A, supported by a pusher 30, is disposed to be movable in the X direction. At the two ends of the pusher 30 are formed guide holes 30A and 30A, and the insertion of guide bars 32 and 32 fixed to the fixed lens barrel 22 in the X direction into these guide holes 30A and 30A causes the pusher 30 to be supported to be movable in the X direction. A guide bar 34 is also fitted to the pusher 30 in the Y direction, and a bearing part 36 disposed on a side edge of the lens holding frame 24 is slidably snapped onto this guide bar 34.

On the other hand in the Y-directional voice coil motor 28, a stator 28B is fixed to the inside face of the fixed lens barrel 22 and a movable element 28A, supported by a pusher 38, is disposed to be movable in the Y direction. At the two ends of the pusher 38 are formed guide holes 38A and 38A, and the insertion of guide bars 40 and 40 fixed to the fixed lens barrel 22 in the Y direction into these guide holes 38A and 38A causes the pusher 38 to be supported to be movable in the Y direction. A guide bar 42 is also fitted to the pusher 38 in the X direction, and a bearing part 44 disposed on a side edge of the lens holding frame 24 is slidably snapped onto this guide bar 42.

Therefore, when the movable element 26A of the X-directional voice coil motor 26 moves in the X direction, the lens holding frame 24 is pushed or pulled by the pusher 30, and at the same time moves in the X direction while being guided by the guide bar 42 of the pusher 38 in the X direction. Also, when the movable element 28A of the Y-directional voice coil motor 28 is extended or contracted in the Y direction, the lens holding frame 24 is pushed or pulled by the pusher 38, and at the same time moves in the Y direction while being guided by the guide bar 34 of the pusher 30 in the Y direction. These actions cause the corrective lens 20 to move in the X and Y directions in a plane orthogonal to the shooting optical axis P.

The anti-vibration mechanism of the corrective lens 20 is provided with a position sensor 48 for detecting the position of the lens holding frame 24 in the X direction as well as a position sensor 46 for detecting the position of the lens holding frame 24 in the Y direction.

Figure 3:
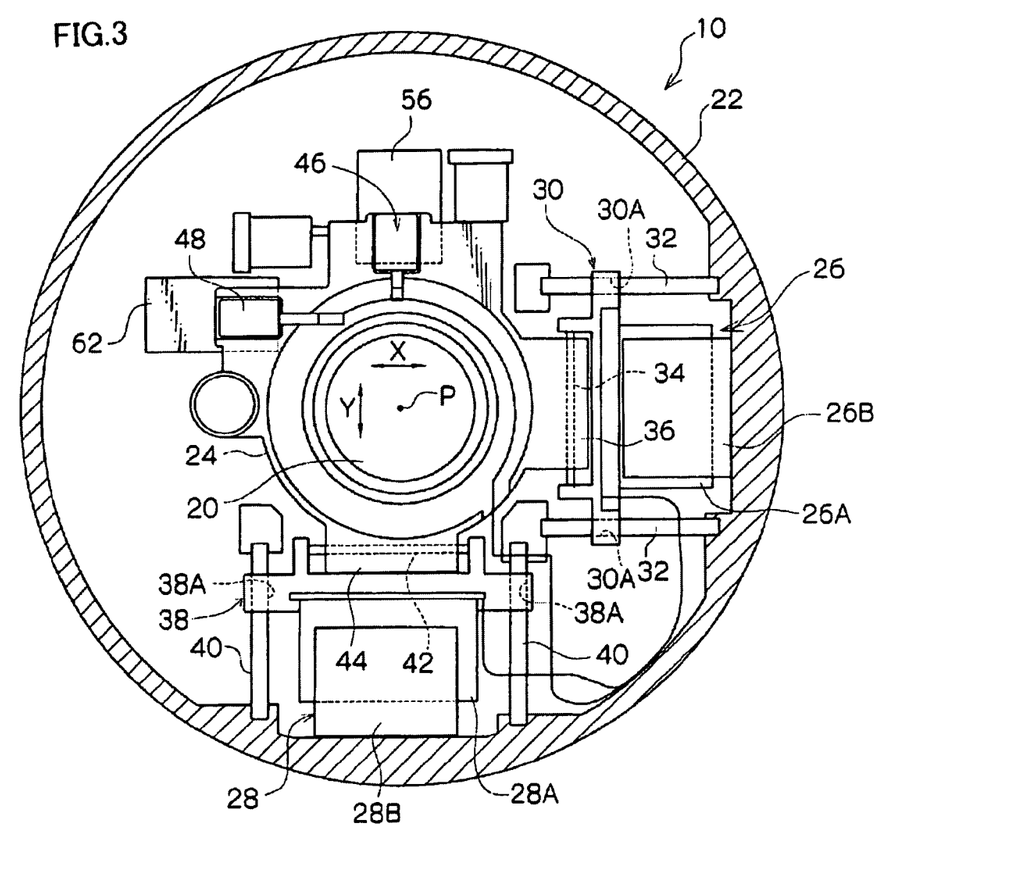
FIG. 3 shows a front view of the anti-vibration mechanism of the vibration-proof lens device shown in FIG. 1.
Figure 4:
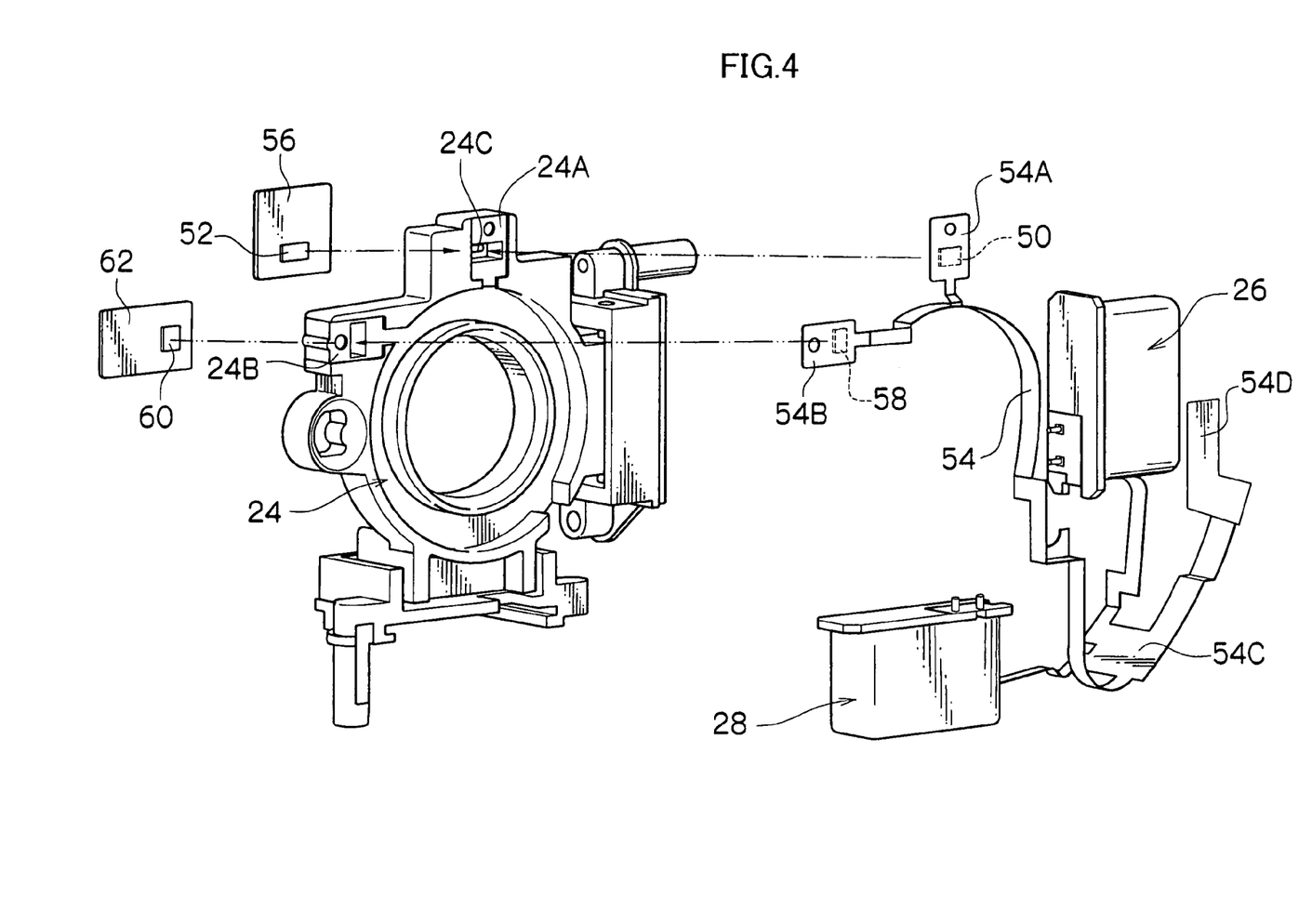
FIG. 4 shows a perspective view of the assembling process of the anti-vibration mechanism shown in FIG. 3.

The position sensor 46 is configured of an LED 50 and a position sensor device (PSD) 52 shown in FIG. 4. The LED 50, in a state of being fitted to an end 54A of a flexible cable 54, is snapped into a fitting groove 24A of the lens holding frame 24 and fixed there. A slit 24C is cut in the fitting groove 24A of the lens holding frame 24, and the PSD 52 is arranged opposite this slit 24C. The PSD 52 is fitted to a substrate 56, and fixed to the fixed lens barrel 22 (see FIG. 3) via this substrate 56. The PSD 52 detects in an analog manner the spot position of a light radiated from the LED 50 via the slit 24C, and this positional information is supplied to the CPU of the vibration-proof lens device 10.

Figure 5:
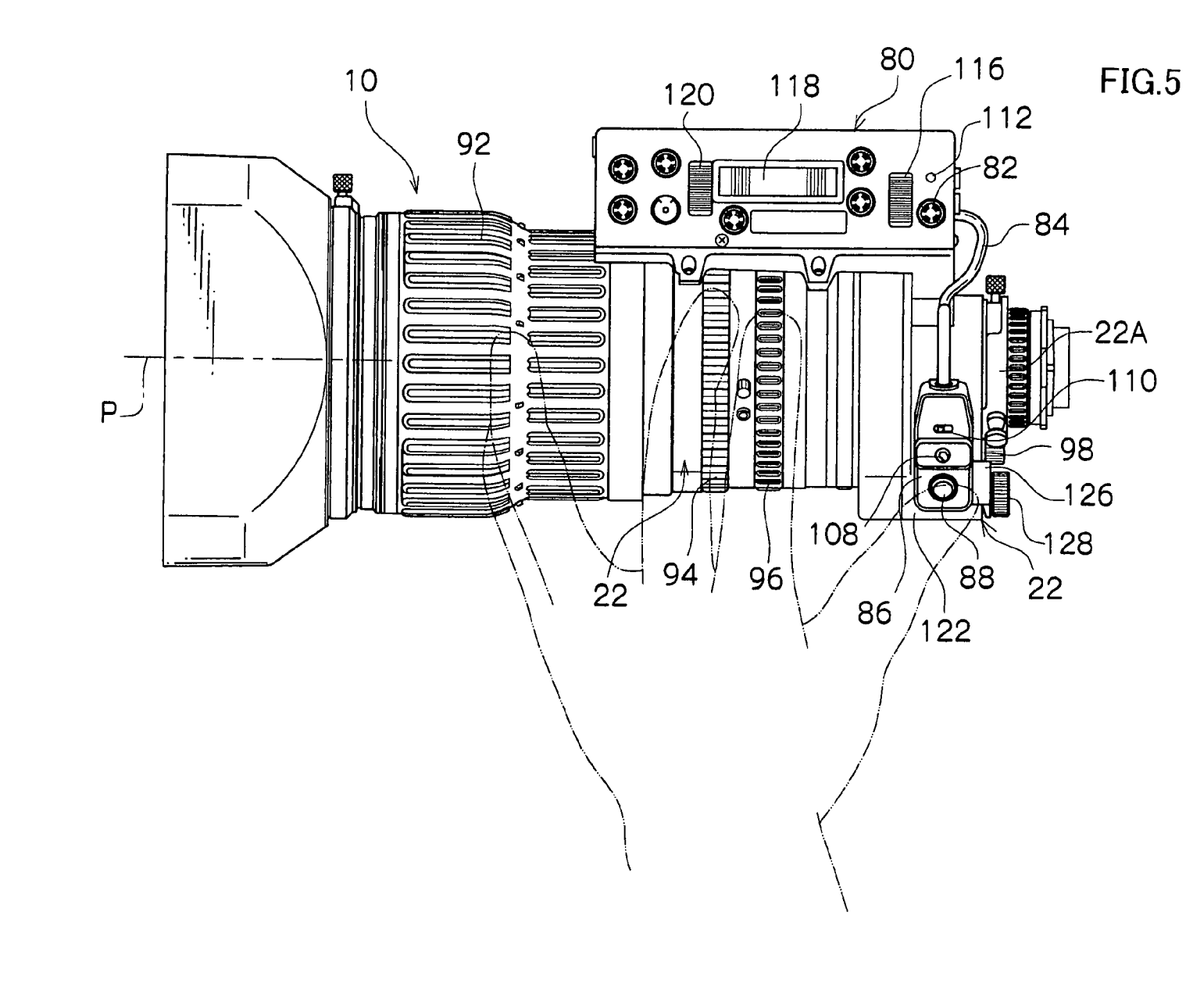
FIG. 5 illustrates the cameraperson's hand position relative to the vibration-proof lens device.

This CPU is built into a drive unit 80 shown in FIG. 5, and turning on an ON/OFF switch 82 for the anti-vibration function provided on the drive unit 80 or an ON/OFF switch 88 of an anti-vibration controller (remote controller) 86 provided on a connector 83 disposed underneath the drive unit 80 (see FIG. 6) via a cable 84 causes power to be supplied from the camera 12 to drive the CPU.

On the other hand, the position sensor 48 shown in FIG. 3 is configured of an LED 58 and a PSD 60 shown in FIG. 4. The LED 58, in a state of being fitted to an end 54B of the flexible cable 54, is snapped into a fitting groove 24B of the lens holding frame 24 and fixed there. A slit (not shown) is cut into the fitting groove 24B of the lens holding frame 24, and the PSD 60 is arranged opposite this slit. The PSD 60 is fitted to a substrate 62, and fitted to the fixed lens barrel 22 (see FIG. 3) via this substrate 62. The PSD 60 detects in an analog manner the spot position of a light radiated from the LED 58 via the slit, and this positional information is supplied to the CPU of the vibration-proof lens device 10.

This causes information indicating the position of the lens holding frame 24 in the X direction and information indicating the position of the lens holding frame 24 in the Y direction to be entered into the CPU from the position sensor 48 and the position sensor 46, respectively. The X-directional voice coil motor 26 and the Y-directional voice coil motor 28 are driven on the basis of these items of positional information.

Incidentally, the flexible cable 54 not only is connected to the X-directional voice coil motor 26 and the Y directional voice coil motor 28 as shown in FIG. 4, but also a fixed part 54C of the flexible cable 54 is fixed to the fixed lens barrel 22 (see FIG. 3) and an end 54D is connected to the anti-vibration control substrate (not shown) of the CPU.

Next will be described the optical system of the vibration-proof lens device 10. The internal structure, though not shown, of the vibration-proof lens device 10 is so configured that in the direction from the object toward the camera 12, a focusing lens, a zoom lens, an iris, the corrective lens 20, an extender and a master lens 90 (see FIG. 6) are arranged in this order.

The focusing lens is moved back and forth along the optical axis P by turning a focusing ring 92 turnably disposed on the fixed lens barrel 22 as shown in FIG. 5. The focusing on the object is thereby controlled.

The zoom lens, consisting of a variable power lens moving in the direction of the optical axis P with a prescribed relationship and a corrective lens, is moved back and forth along the optical axis P by turning a zooming ring 94 turnably disposed on the fixed lens barrel 22. The focal distance of the object is thereby controlled.

The iris has an iris regulating mechanism which, when an iris ring 96 is turned, widens or narrows the diaphragm aperture interlocked with the turning. This enables, when the iris ring 96 is turned, the aperture to be varied and thereby to regulate the aperture stop.

The extender is provided with lenses for switching the magnification of the image formed by the optical system of the vibration-proof lens device 10 between, for instance, one and two, each lens matching one or the other of the magnifications (hereinafter these lenses will be referred to as "extender lenses"), and the extender lens to be inserted on the optical axis P is switched over to one of the desired magnification by a turn of a lever 98, which is operated either manually or by the action of the motor of the drive unit 80. The master lens 90 is intended for directing the object light emitted from the extender lens toward the CCD of the camera 12.

The focusing ring 92, the zooming ring 94 and the iris ring 96 are manipulated by the left hand of a cameraperson 100 represented by dotted chain lines in FIG. 2. The cameraperson 100 who operates the television camera is positioned beside the camera 12, holding the control rod 102 of the pan head 19 with the right hand and manipulating the vibration-proof lens device 10 with the left hand while looking through an electronic viewfinder 104 of the camera 12 to confirm the object. Of the left hand, the little and ring fingers are used for turning the relatively large focusing ring 92 as represented by two-dot chain lines in FIG. 5, the middle finger, for turning the zooming ring 94, and the forefinger, for turning the iris ring 96. With the respective fingers being kept on the manipulation rings 92, 94 and 96 for which they are responsible, the ON/OFF switch 88 of the anti-vibration controller 86 is manipulated with the usually free thumb.

Next will be described the anti-vibration controller 86.

As shown in FIG. 1 and FIG. 5, the anti-vibration controller 86 is arranged on the outer circumference of the fixed lens barrel 22 in which the extender lenses are positioned. When the ON/OFF switch 88 of the anti-vibration controller 86 is to be manipulated by the cameraperson 100 of FIG. 2, the cameraperson 100 can manipulate it with the unengaged thumb without disengaging the fingers from the manipulation rings 92, 94 and 96 as stated above. As the cameraperson 100 is shooting while looking through the viewfinder 104, he or she manipulates the positions of the focusing lens, the zoom lens and the iris according to what the fingers sense by touch. Therefore, once the cameraperson 100 moves the left hand off the focusing ring 92, the zooming ring 94 and the iris ring 96, their respective positions will deviate from what the fingers remember, and accordingly the fingers should remain in their required positions at least until the shooting of one scene is completed. Even in such a shooting situation, according to the invention, the ON/OFF switch 88 of the anti-vibration function can be manipulated while operating the manipulation rings 92, 94 and 96.

The anti-vibration controller 86 is also fitted with, in addition to the ON/OFF switch 88, an ON/OFF indicator lamp 106 (see FIG. 6), an anti-vibration characteristic change-over switch 108 and a corrective direction change-over switch 110 to enable the whole anti-vibration function to be remotely controlled with the anti-vibration controller 86. For instance, by fitting this anti-vibration controller 86 to the control rod 102 of the pan head 19 shown in FIG. 2, the right hand, which manipulates the control rod 102, can also be used for remotely controlling the anti-vibration function.

The anti-vibration characteristic change-over switch 108 is intended for changing over the level of anti-vibration sensitivity between a normal mode and a high sensitivity mode, while the corrective direction change-over switch 110 is intended for changing over the corrective direction of the corrective lens 20 shown in FIG. 3 between both vertical and lateral and vertical only. Incidentally, the drive unit 80 is also fitted with an ON/OFF indicator lamp 112 (see FIG. 5), an anti-vibration characteristic change-over switch 114 (see FIG. 6) and a corrective direction change-over switch 116 (see FIG. 5). Furthermore, the drive unit 80 is also provided with, in addition the switches 114 and 116, a plurality each of switches and levers including a zoom seesaw lever 118 for controlling the focal distance and an auto/manual iris change-over switch 120. The switches and levers disposed on the drive unit 80 are manipulated by the cameraperson's right hand when the camera 12 is shouldered during operation.

Figure 6:
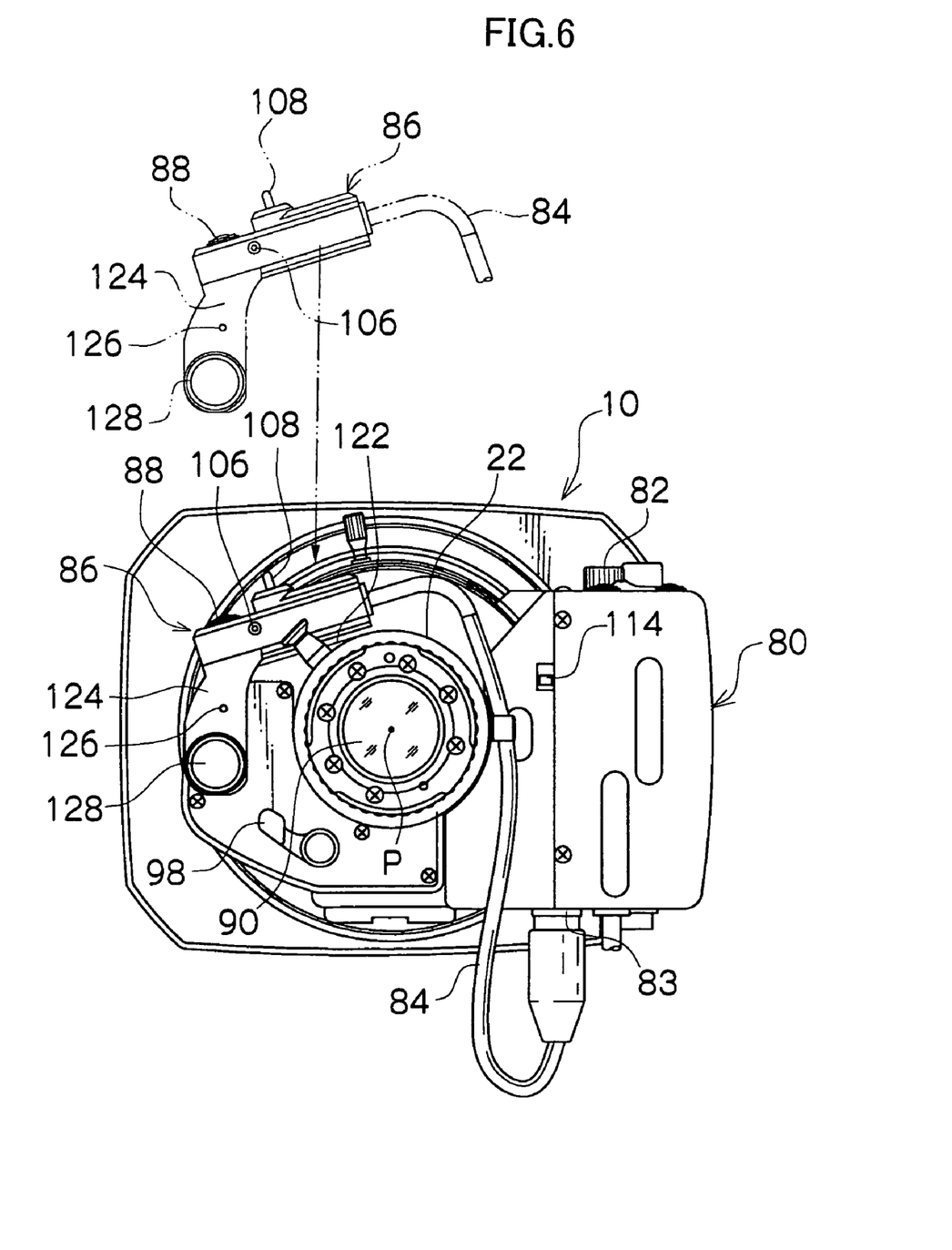
FIG. 6 illustrates a state in which an anti-vibration controller is fitted to the fixed lens barrel of extender lenses.

The anti-vibration controller 86 of the vibration-proof lens device 10 is fitted to a flat part 122 formed on the outer circumference of the fixed lens barrel 22 as shown in FIG. 5, and this flat part 122 is inclined toward the left as shown in FIG. 6. This inclined flat part derives from the relationship of the supporting axis of the lens frame of the extender lenses and the lenses themselves, and is shaped like this according to the prior art as well (cf. the Japanese Patent Applications Laid-Open Nos. 6-347887, 8-9207, 9-90469 and so forth). With note taken of the direction of this inclined flat part 122 which is toward the cameraperson 100 as shown in FIG. 2, by fitting the anti-vibration controller 86 to that flat part 122, the left thumb of the cameraperson 100 is enabled to touch the switches 88, 108 and 110 of the anti-vibration controller 86 in a natural way as shown in FIG. 5 without having to be bent in a strained manner. The operating ease of the ON/OFF switch 88 is thereby improved.

Further, the part of the outer circumference of the fixed lens barrel 22 in which the extender lenses are positioned and to which the anti-vibration controller 86 is fitted is formed smaller in diameter than other parts of the outer circumference of the lens barrel in which the focusing lens and the zoom lens are positioned by reason of the size of the extender lenses. By arranging the anti-vibration controller 86 in this smaller diameter part (stepped part), the stepped part is virtually eliminated, and the thumb is thereby enabled to reach without strain the ON/OFF switch 88 of the anti-vibration controller 86 and other switches 108 and 110, making it possible also to operate the manipulation rings 92, 94 and 96, the ON/OFF switch 88 and other switches 108 and 110 at the same time without trouble.

By so configuring the anti-vibration controller 86 as to have substantially the same thickness as the step between the external diameter of the lens barrel and the fixed lens barrel 22 in which the extender lenses are positioned as shown in FIG. 1, there is no fear that the thumb fail to reach the switch, and the design is also aesthetically improved. To add, the fitting position of the anti-vibration controller 86 is not limited to the outer circumference of the fixed lens barrel 22 in which the extender lenses are positioned, but may be on the outer circumference of a smaller diameter fixed lens barrel 22A in which the master lens 90 is positioned. In this case, the anti-vibration controller 86 can be configured in a right size to be fittable to the fixed lens barrel 22A. Or the ON/OFF switch 88 and other switches 108 and 110 can as well be directly fitted to the outer circumference of the fixed lens barrel 22 or 22A.

Further in this vibration-proof lens device 10, the anti-vibration controller 86 is fitted to the outer circumference of the fixed lens barrel 22 via the same bracket (linking member) 124 detachably fitted to the control rod 102 of the pan head 19. The bracket 124 is provided with a positioning hole 126 and a fixing screw 128. By snapping the positioning hole 126 onto a pin on the fixed lens barrel 22 or the control rod 102 and screwing the fixing screw 128 into a screw hole in the fixed lens barrel 22 or the control rod 102, the anti-vibration controller 86 is fitted to the vibration-proof lens device 10 or the control rod 102 via the bracket 124. By using in common the bracket 124 as a linking member in this way, the anti-vibration controller 86 can be fitted to the vibration-proof lens device 10 in the state of being detached from the control rod 102 as it is. Also, the anti-vibration controller 86 can be fitted to the control rod 102 in the state of being detached from the vibration-proof lens device 10 as it is. Accordingly, the fitting work to be done at the time of changing the fitting position of the anti-vibration controller 86 can be simplified.

Further, since the ON/OFF switch 88 of the anti-vibration controller 86 is fitted face up on a plane substantially parallel to the optical axis P of the vibration-proof lens device 10 as shown in FIG. 6, the operating ease of the ON/OFF switch 88 with the thumb (see FIG. 5) is improved. In addition, as the ON/OFF indicator lamp 106 is fitted toward the camera on a plane substantially vertical to the optical axis P as shown in FIG. 6, the cameraperson 100 who manipulates the television camera can see the ON/OFF indicator lamp 106 while looking through the viewfinder 104. Therefore, he or she can readily confirm the ON/OFF state of the anti-vibration function while shooting a scene.

What is claimed is:

1. A vibration-proof lens device, comprising:
   a fixed lens barrel,
   a corrective lens for correcting image blurring,
   a manual manipulation ring disposed rotatably around the fixed lens barrel;
   an ON/OFF switch for anti-vibration is configured as a unit and is fixed to an outer circumference of the fixed lens barrel in which an extender lens section or a master lens section provided in the vibration-proof lens device is positioned; and
   a remote control unit detachably installed on the fixed lens barrel, wherein the ON/OFF switch is fitted to the remote control unit, wherein the ON/OFF switch fitted to the remote control unit is fitted face up on a plane substantially parallel to an optical axis of the vibration-proof lens device and an ON/OFF indicator lamp is fitted toward a camera on a plane substantially vertical to the optical axis.

2. The vibration-proof lens device according to claim 1, wherein the remote control unit is fitted to an inclined flat part on the outer circumference of the fixed lens barrel.

3. The vibration-proof lens device according to claim 2, wherein a part of the outer circumference of the fixed lens barrel where the remote control unit is fitted is formed smaller in diameter than other parts of the outer circumference of the lens barrel.

4. The vibration-proof lens device according to claim 3, wherein the remote control unit is fitted to the outer circumference of the fixed lens barrel via a same linking member detachably fitted to a control rod of a pan head.

5. The vibration-proof lens device according to claim 2, wherein the remote control unit is fitted to the outer circumference of the fixed lens barrel via a same linking member detachably fitted to a control rod of a pan head.

6. The vibration-proof lens device according to claim 1, wherein a part of the outer circumference of the fixed lens barrel where the remote control unit is fitted is formed smaller in diameter than other parts of the outer circumference of the lens barrel.

7. The vibration-proof lens device according to claim 6, wherein the remote control unit is fitted to the outer circumference of the fixed lens barrel via a same linking member detachably fitted to a control rod of a pan head.

8. The vibration-proof lens device according to claim 1, wherein the remote control unit is fitted to the outer circumference of the fixed lens barrel via a same linking member detatchably fitted to a control rod of a pan.

9. A vibration-proof lens device, comprising:
   a fixed lens barrel,
   a corrective lens for correcting image blurring,
   a manual manipulation ring disposed rotatably around the fixed lens barrel;
   an ON/OFF switch for anti-vibration is configured as a unit and is fixed to an outer circumference of the fixed lens barrel in which an extender lens section or a master lens section provided in the vibration-proof lens device is positioned; and
   a remote control unit detachably installed on the fixed lens barrel, wherein the ON/OFF switch is fitted to the remote control unit,
   wherein the remote control unit is provided with an ON/OFF indicator lamp, an anti-vibration characteristic change-over switch and a corrective direction change-over switch, and
   wherein the ON/OFF switch fitted to the remote control unit is fitted face up on a plane substantially parallel to an optical axis of the vibration-proof lens device and the ON/OFF indicator lamp is fitted toward a camera on a plane substantially vertical to the optical axis.

10. The vibration-proof lens device according to claim 9, wherein the remote control unit is fitted to an inclined flat part on the outer circumference of the fixed lens barrel.

11. The vibration-proof lens device according to claim 10, wherein a part of the outer circumference of the fixed lens barrel where the remote control unit is fitted is formed smaller in diameter than other parts of the outer circumference of the lens barrel.

12. The vibration-proof lens device according to claim 11, wherein the remote control unit is fitted to the outer circumference of the fixed lens barrel via a same linking member detachably fitted to a control rod of a pan head.

13. The vibration-proof lens device according to claim 10, wherein the remote control unit is fitted to the outer circumference of the fixed lens barrel via a same linking member detachably fitted to a control rod of a pan head.

14. The vibration-proof lens device according to claim 9, wherein a part of the outer circumference of the fixed lens barrel where the remote control unit is fitted is formed smaller in diameter than other parts of the outer circumference of the lens barrel.

15. The vibration-proof lens device according to claim 14, wherein the remote control unit is fitted to the outer circumference of the fixed lens barrel via a same linking member detachably fitted to a control rod of a pan head.

16. The vibration-proof lens device according to claim 9, wherein the remote control unit is fitted to the outer circumference of the fixed lens barrel via a same linking member detachably fitted to a control rod of a pan head.

* * * * *